United States Patent Office 2,803,548
Patented Aug. 20, 1957

2,803,548
METHOD OF MAKING GELATIN-CONTAINING FOOD PREPARATIONS WHICH DISSOLVE AT ROOM TEMPERATURE AND GEL AT ROOM TEMPERATURE

Elliot B. Hagerty, Whittier, Calif., assignor to Louis Milani Foods, Inc., Los Angeles, Calif., a corporation of Illinois No Drawing. Application February 7, 1955,
Serial No. 486,717

3 Claims. (Cl. 99—130)

This invention relates to powdered edible preparations containing gelatin, which dissolve in water at room temperature and then set to a gel, and to processes of making the same.

A popular dessert for preparation in the home consists of a granulated mixture of gelatin, sugar, and flavoring materials. This mixture does not dissolve in water at room temperature. It therefore is necessary to dissolve it in hot water, and then cool the solution until it gels. There is some loss of odor and flavor due to evaporation of volatile flavoring oils by the hot water; and it is an inconvenience to the housewife to have to heat water to prepare the product, and then to refrigerate the product before it can be served. While some of these preparations will set at room temperature, the powdered product must be dissolved many hours before serving, if the solution is not refrigerated.

The principal object of the present invention is to provide granulated mixtures containing gelatin, which can be stirred into tap water at room temperature, and which will immediately dissolve sufficiently for the preparation of a foodstuff; and which will thereafter set to a gel at room temperature so that the product may be served as a dessert, salad or the like.

The prior art, as illustrated by U. S. Patent No. 2,166,074, issued to Reichel, discloses gelatin products which dissolve in cold water. This type of gelatin is obtained in a porous, friable form by freezing an aqueous solution of gelatin and then subliming the ice from the frozen material under almost perfect vacuum conditions and at a very low temperature.

The type of product so produced has never been offered to the public for food purposes, because the cost of manufacture of the product is so great that it cannot be sold at a price which housewives will pay; and because the extremely low density (0.01) makes the product so bulky that boxing and shipping costs would be prohibitive.

The present invention is founded on the discovery that a gelatin solution to which sugar and/or citric acid is added can be dehydrated under less severe conditions of temperature and pressure than hithertofore known to produce a gelatin product which dissolves in water at room temperature and which sets to a gel at room temperature. The utilization of this discovery provides the first commercially feasible process for the preparation of gelatin desserts which can be easily made by the housewife.

In general, this new process consists of evaporating a gelatin-sugar solution under easily obtainable conditions, pulverizing the dried product and then mixing it with flavoring materials.

In this new process, a solution of gelatin and a sugar or sugars in water is first prepared. Among the sugars which can be used are sucrose, dextrose, cane syrup or mixtures of any of these. In fact, other saccharine materials of edible grade such as mannitol and sorbitol may also be used.

The sugar not only sweetens the gelatin, but also improves the dispersing properties and texture of the dried mix. In addition, the sugar facilitates a rapid drying operation.

The sugar-gelatin ratio may vary over a wide range. Thus no sugar may be added, or on the other hand, quantities more than ten times the dry weight of gelatin may be added. Generally speaking, the quantity of sugar in the water solution should be greater than the quantity of gelatin on a dry weight basis. A sugar-gelatin ratio of nine parts to one part has been found optimum.

As the proportional amount of sugar is increased the gelatin mix becomes more hygroscopic. This results in a clearer solution in cold water. Hygroscopicity is also affected by the type of sugar. For example, glucose syrup produces a mix of greater hygroscopic nature than cane sugar.

The quantity of water must suffice to dissolve the gelatin. This is the only limitation, and, of course, amounts greater than this bare minimum may be used.

The gelatin-water mixture is heated to bring the gelatin into solution.

The solution of gelatin or gelatin and other components such as sugar, citric acid and flavoring is now dried.

Conditions during drying can vary to a great degree and a gelatin soluble in cold water will result. For example, drying at 100° C. and atmospheric pressure yields a completely soluble product, which, unfortunately, does not form a gel. Drying at 0° C. to 25° C. produces a gelatin of only partial solubility.

It has been found that drying the gelatin solution under reduced pressure and at an elevated temperature produces a superior product. When the gelatin material is maintained between about 37° C. and about 70° C. and under a pressure of between about 50 and about 100 mm. of Hg, the resulting product is fluffy, completely soluble in cold water, and forms an excellent gel at room temperature. Of course, these conditions may vary to some degree; however, between 0° C. and 37° C. the resulting dry product is dense and not completely soluble in cold water although a gel does form. If the material is overheated during the drying step, for example above 100° C., it hardens and it is not completely soluble in cold water.

The dry gelatin is now pulverized, mixed with suitable flavoring and coloring matter, and packaged. In the case of gelatin desserts which normally contain citric acid, it has been found that the addition of citric acid to the original gelatin, or gelatin and sugar solution prior to drying does not in any way alter the solubility of the dried product. Thus, if an unflavored gelatin is desired, a product ready for packing and distribution is obtained at the end of the drying process.

Since the drying process causes some loss of flavor, it is preferable to add flavoring materials after this step.

The advantages of preparing a cold soluble gelatin at temperatures and pressures well above those described in the art are obvious. The expensive and clumsy machinery used in sublimating is no longer necessary.

Then too, this new process is much more rapid than the one presently in use. The sublimation of an aqueous solution of gelatin is usually effected at approximately −80° C. In this new process evaporation takes place at a temperature ranging optimally between 37° C. and 70° C. Keeping in mind that the concentration of gelatin changes as evaporation proceeds and that a true solution is not being dealt with here, still an approximation of the relative rates of drying can be easily ascertained by comparing vapor pressures. Such a comparison indicates that the new process for the preparation of a cold soluble gelatin is from 32,800 to as much as 400,000 times as rapid as the sublimation process.

The following examples are merely illustrative of the

Example No. 1

One part of dry commercial gelatin is mixed with nine parts of granulated cane sugar. About ten parts of water is added to this mixture and the suspension heated until solution is effected. Water is evaporated from the solution at 50 to 100 mm. Hg pressure, and the temperature of the liquid is allowed to rise to 70° C.

The resulting product after pulverization is mixed with flavoring materials and goes into solution with 5.6 parts of cold water. This solution sets to a gel.

Example No. 2

If Example No. 1 is repeated using dextrose instead of sucrose a dense rather than fluffy product of comparable solubility is obtained.

Example No. 3

If Example No. 1 is repeated using equal parts of sucrose and corn syrup instead of sucrose alone, a dense rather than fluffy product of comparable solubility is obtained.

Example No. 4

One part of gelatin is mixed with three parts of water, heated to effect solution, and the water evaporated at a pressure of 50 to 100 mm. Hg and a temperature ranging between 37° C. and 70° C. The dried product is pulverized and sucrose is added so that the gelatin constitutes approximately 10% of the final dry mixture. Citric acid is added to a concentration of 1.88% of the mixture. Color and flavor may then be added.

To one part of the latter mixture 5.6 parts of cold water is added to form a solution which sets to a gel.

Example No. 5

The following are mixed:

|  | Parts |
|---|---|
| Dry commercial gelatin | 20 |
| Granulated cane sugar | 90 |
| Citric acid | 4 |
| Water | 100 |

The suspension is heated to effect solution and the water evaporated at 50 to 100 mm. Hg pressure at a temperature between 37° C. and 70° C.

114 parts of the dried product are then mixed with 86 parts of sugar and flavor. One part of the latter mixture is added to 5.6 parts of cold water to form a solution which gels upon standing.

Example No. 6

Dry commercial gelatin is added to water and the mixture heated until solution is effected. Water is evaporated from the solution at 50 to 100 mm. Hg pressure, and at a temperature varying between 37° C. and 55° C. The resulting product is of puffy consistency having a 4.0% moisture content. It forms a good solution in cold water which sets to a gel.

Example No. 7

A flavored gelatin food for consumer use is made up according to the following composition:

|  | Percent |
|---|---|
| Sucrose, granulated | 88.0 |
| Gelatin, 225 Bloom | 10.0 |
| Citric acid, anhydrous | 1.8 |
| Loganberry flavor | 0.168 |
| FDC Red No. 2 | 0.0311 |
| FDC Blue No. 1 | 0.0009 |
|  | 100.00 |

Example No. 8

A non-sweet, cold soluble gelatin preparation, using my product can be made in the following manner:

|  | Percent |
|---|---|
| Lactose | 88.25 |
| Gelatin, 225 Bloom | 10.00 |
| Citric acid, anhydrous | 1.75 |
|  | 100.00 |

The dry product in accordance with this invention can be brought in solution with milk or cream as well as with water. In these instances citric acid is not included in the dry powder as it would curdle the milk products.

In my experiments I compared the gel strengths of my specially prepared dessert powders and the usual commercial gelatins. The gel strengths of the latter are 10% greater than the former. To compensate for this, I suggest that the new type dessert powder be made with 10% more gelatin than the old. This provides a higher nutritive value per portion of like volume for the consumer then receives 10% more of utilizable protein.

On the basis of the foregoing I claim:

1. A process for making an edible gelatin-containing powder which rapidly dissolves in cold water and sets to a gel at room temperature comprising the steps of dispersing gelatin in an aqueous solution of saccharine material of edible quality, wherein the weight of the saccharine material exceeds the weight of the gelatin on a dry basis and is no greater than about ten times the dry weight of gelatin; heating the solution to dissolve the gelatin, evaporating the water from the solution under a pressure of 50 to 100 mm. of Hg while maintaining said solution at a temperature between 37 degrees C. and 70 degrees C. until a sensibly dry product is obtained; and pulverizing the resultant dried product.

2. A process for making an edible gelatin-containing powder which rapidly dissolves in cold water and sets to a gel at room temperature comprising the steps of dispersing gelatin in an aqueous solution of sucrose of edible quality, wherein the weight of the sucrose exceeds the weight of the gelatin on a dry basis and is no greater than about ten times the dry weight of gelatin; heating the solution to dissolve the gelatin, evaporating the water from the solution under a pressure of 50 o 100 mm. of Hg while maintaining said solution at a temperature between 37 degrees C. and 70 degrees C. until a sensibly dry product is obtained; and pulverizing the resultant dried product.

3. In processes for the production of edible gelatin-containing powder involving dispersing gelatin in an aqueous solution, removing water from said solution to obtain a dried product and pulverizing said dried product, the improvement comprising evaporating water from the solution at a pressure between about 50 mm. and about 100 mm. of Hg while maintaining the temperature of the solution at between about 37° C. and about 70° C.

References Cited in the file of this patent

UNITED STATES PATENTS

| 1,735,356 | Neff | Nov. 12, 1929 |
|---|---|---|
| 2,224,167 | Stokes | Dec. 10, 1940 |

FOREIGN PATENTS

| 435,272 | Great Britain | Sept. 18, 1935 |
|---|---|---|
| 596,731 | Great Britain | Jan. 9, 1948 |

UNITED STATES PATENT OFFICE

CERTIFICATE OF CORRECTION

Patent No. 2,803,548                                   August 20, 1957

Elliot B. Hagerty

It is hereby certified that error appears in the printed specification of the above numbered patent requiring correction and that the said Letters Patent should read as corrected below.

Column 1, line 51, for "(0.01)" read -- (0.001) --; column 4, line 45, for "evaporaing" read -- evaporating --; line 46, for "50 o 100 mm." read -- 50 to 100 mm.--.

Signed and sealed this 24th day of December 1957.

(SEAL)
Attest:

KARL H. AXLINE
Attesting Officer

ROBERT C. WATSON
Commissioner of Patents